United States Patent
Yates

[19]

[11] Patent Number: 6,010,188

[45] Date of Patent: Jan. 4, 2000

[54] BICYCLE SADDLE AND SUSPENSION THEREFOR

[76] Inventor: Paul M. Yates, 5814 Briar Tree Dr., LaCanada, Calif. 91011

[21] Appl. No.: 09/137,985

[22] Filed: Aug. 21, 1998

[51] Int. Cl.[7] .................................................. B25J 1/02
[52] U.S. Cl. ........................................ 297/215; 297/195.1
[58] Field of Search ................................. 297/215, 196, 297/198, 214, 215.16, 195.1, 205, 208, 209

[56] References Cited

U.S. PATENT DOCUMENTS

| | | | |
|---|---|---|---|
| Re. 11,350 | 7/1893 | Bergfels | 297/215 |
| 470,707 | 3/1892 | Saunders | 297/215 |
| 5,489,139 | 2/1996 | McFarland | 297/195.1 |
| 5,692,801 | 12/1997 | Yu | 297/195.1 |

*Primary Examiner*—Laurie K. Cranmer
*Attorney, Agent, or Firm*—Walter A. Hackler

[57] ABSTRACT

A bicycle saddle and suspension generally includes a U-shaped suspension member having an elongate portion for attachment to an underside of a bicycle saddle and two end portions with each end portion having an end subtending arcuate member for providing resiliency between the subtended end and the elongate portion. The subtended ends are disposed in an opposing relationship with a pair of rails disposed between the opposing subtended ends. A plurality of resilient members enable tailoring of the resilient characteristics of the suspension in both transverse and longitudinal axis of the bicycle saddle.

17 Claims, 3 Drawing Sheets

BICYCLE SADDLE AND SUSPENSION THEREFOR

The present invention generally relates to cycle saddles and is more particularly directed to a bicycle saddle and suspension which not only provides an adjustable support for riders of different weights, but enables fore-aft flexure of the saddle.

The majority of bicycle saddles currently available generally include a seat portion and a support frame with the saddle being generally horizontal along a longitudinal axis with a narrow horn, or pommel, and a substantially wider tail portion.

The seat is generally a shell or frame which may be a molded plastic or nylon type material which is covered by a suitable cushion material. A finished surface such as a leather, vinyl, or plastic material, may be secured over the cushion cover and/or shell to provide a saddle suitable for riding.

In general, prior art saddles utilize a support frame which includes a pair of support rails that extend along the longitudinal axis of the saddle and are fixed to the underside of the frame by integral molding or any other known means.

The rails extend generally parallel with one another with a predetermined distance therebetween for securing the rails to a conventional seat post of a bicycle in order to mount the saddle on the bicycle. The rails are typically metal such as aluminum, steel, titanium, or the like.

A bicycle, when ridden over a period of time, may become increasingly uncomfortable due to shocks and vibrations transmitted to the bicycle seat from uneven road surfaces. This is particularly true when no suspension system is provided between the bicycle post and the saddle. However, even when such suspension systems are provided, they do not compensate for the weight of the rider.

That is, the suspension systems are not adaptable for use by riders of different weights. Even if a separate suspension system is provided, it adds significant weight to the bicycle which, of course, is of utmost importance in competitive situations. Because the typical bicycle saddle only utilizes the padding therein for absorbing vibrations, such vibrations caused by bumps or unevenness in the road are transmitted directly to the rider. It should be appreciated that over a period of time such vibrations cause the rider to become fatigued or sore.

The bicycle saddle and suspension in accordance with the present invention overcomes these disadvantages by providing resiliency between the bicycle post and the saddle, which is adjustable to accommodate for riders of different sizes and weights.

SUMMARY OF THE INVENTION

A bicycle saddle suspension in accordance with the present invention includes a generally U-shaped suspension member having an elongated portion which provides a means for attachment to the underside of a bicycle saddle and two end portions. Each of the end portions include an end subtending arcuate member, extending from the elongate portion, which provides a resilient means between the subtended end and the elongated portion. The subtended ends are disposed in an opposing relationship and rails, which may be generally parallel, are disposed between the opposing subtended ends.

More particularly, in accordance with the present invention, the elongated portion means and the arcuate member means may be integrally formed from a plastic material. Still more particularly, the arcuate member means of each end portion may have a generally C-shaped cross section.

Importantly, the present invention also comprises at least one resilient member means disposed within one of the C-shaped arcuate member means for changing the resiliency of the C-shaped arcuate member means. Alternatively, two resilient member means may be provided with one disposed within one of the C-shaped arcuate member means for changing the resiliency of the C-shaped arcuate member means. In this manner a different resiliency may be provided to accommodate for either riders of different weights or to suit the preference of individual riders.

When two resilient member means are utilized, they may have different resiliency in order to further tailor the resilient characteristics of the saddle. That is, a forward portion or horn portion of the saddle may have more resilience than the tail portion, or vice-versa. In addition, resiliency is provided in a fore-aft direction by the structure of the present invention.

The bicycle saddle suspension may include a plurality of separate resilient member means for changing the resiliency of the C-shaped arcuate member means with each of the plurality of separate resilient member means having a different resiliency and are adapted to be removably inserted within one of the C-shaped arcuate member means. In this manner an entire spectrum of resiliency is provided by the suspension system in accordance with the present invention.

Further tailoring of the suspension system in accordance with the present invention includes providing arcuate member means with different thicknesses or different radii of the C-shaped arcuate member means.

In combination, the present invention also encompasses a bicycle saddle having a shell with a tail portion and a horn extending therefrom. In this embodiment, a generally U-shaped suspension member, having an elongate portion, may be integrally molded to an underside of the bicycle shell. The U-shaped suspension member further includes two end portions with each end portion having an end subtending arcuate member means extending from the elongate portion for providing resiliency between the subtended end and the elongation portion means. The subtended ends are disposed in an opposing relationship and a pair of generally parallel rails are disposed between the opposing subtended ends.

BRIEF DESCRIPTION OF THE DRAWINGS

The advantages and features of the present invention will be better understood by the following description when considered in conjunction with the accompanying drawings, in which.

DETAILED DESCRIPTION

Figure 1:
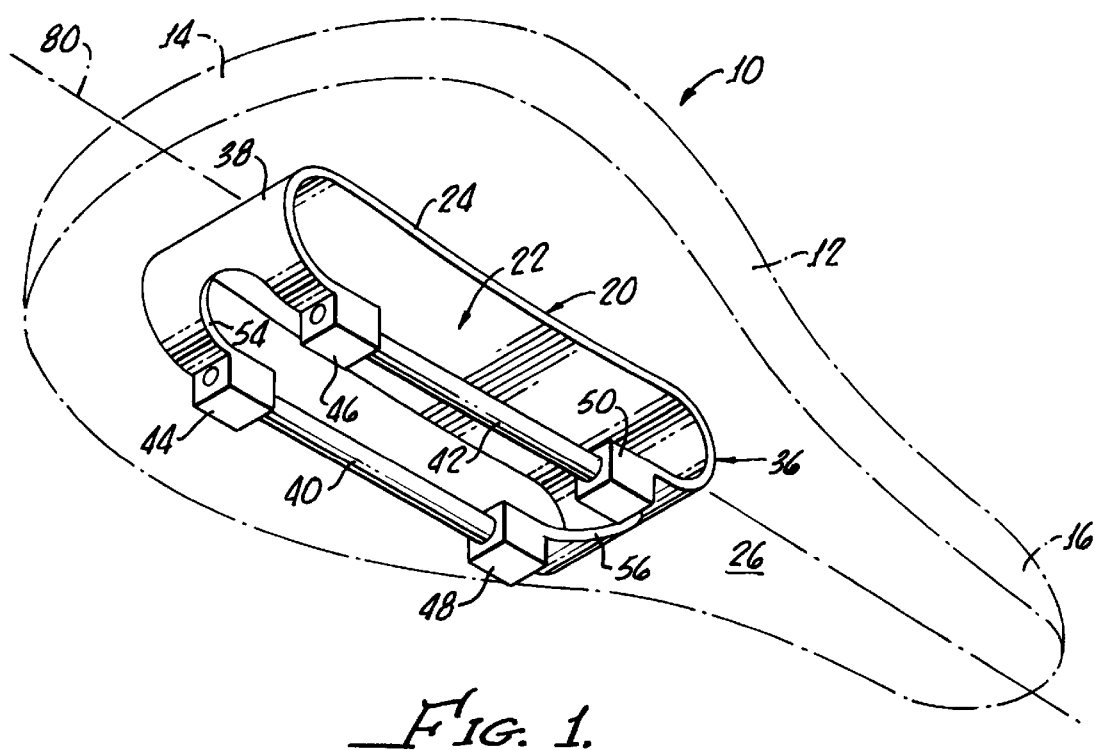
FIG. 1 is a perspective view of a bicycle saddle and bicycle saddle suspension system made in accordance with the present invention.

With reference to FIG. 1, there is shown a bicycle saddle 10 in accordance with the present invention, which generally includes a shell 12 having a tail portion 14 and a horn 16 extending therefrom.

The shell 10 may be formed from a suitable plastic material and may incorporate an infinite variety of shapes or sizes as may be desired in accordance with the nuances of various bicycle riders.

A suspension 20 is provided which includes a generally U-shaped suspension member 22 having an elongate portion means for attachment to an underside 26 of the shell 12.

Figure 2:
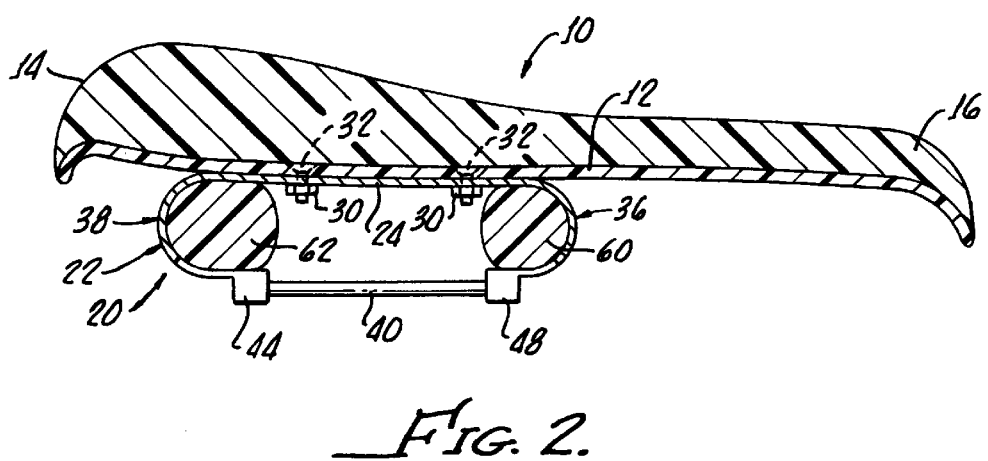
FIG. 2 is a cross-section of the bicycle saddle and suspension system as shown in FIG. 1 along with a pair of resilient members shown and disposed in position within the C-shaped arcuate members which depend from an elongate portion of the bicycle saddle suspension.

As shown in FIG. 1, the suspension member may be integrally formed with the shell 12 underside 26. Alternatively, as shown in FIG. 2, the elongate portion means 24 may be attached to the shell 12 by means of conventional nuts 30 and screws 32, heat staking or ultrasonic welding.

In general, the U-shaped member 22 may be formed from any suitable plastic, nylon or metallic material. However, when integrally formed with the shell, it may be of the same material as the shell 12 or of a different polymeric material, depending upon molding sophistication.

Again referring to FIGS. 1 and 2, the generally U-shaped suspension member 20 further includes subtending arcuate member means 36, 38 extending from the elongate portion 24, which provide rocker-like resiliency between the subtended ends 36, 38 and the elongate portion 22. As more clearly shown in FIG. 2, the arcuate member means 36, 38 have a generally C-shaped cross section and the subtending arcuate member means 36, 38 are disposed in an opposing relationship with a pair of generally parallel rails 40, 42 disposed therebetween. The rails 40, 42 may be formed from any suitable material, such as aluminum, steel or titanium and attached to support portions 44, 46, 48, 50.

Importantly, the present invention may include the rails 40, 42 as insert molded into the support portions 44, 46, 48, 50. This configuration facilitates mounting of the rails 40, 42 in an inexpensive manner heretofore not utilized in the manufacture of bicycle saddles and bicycle saddle suspensions. Advantageously, such assembly provides an economic benefit for the saddle 10 and suspension 20 made in accordance with the present invention.

It should be appreciated that the thicknesses of the arcuate portions 36, 38 may be different in order to tailor the resiliency of the arcuate portions 36, 38 which is manifested between the rails 40, 42 and the shell 12. Further, cut-outs 54, 56 may also be provided to tailor the resiliency.

More importantly, with regard to custom-tailoring of the resiliency of the suspension system 20 to a particular rider, resilient members 60, 62, may be provided and shaped for conforming tightly within the C-cross section of the arcuate members 36, 38 as shown in FIG. 2. These resilient members 60, 62 may be formed of any suitable rubber or elastomer and sized to be frictionally held within the arcuate members 36, 38 or may include protruding portions (not shown in FIG. 2) for extending into the cutout 54, 56 for stabilizing the resilient members 60, 62 within the arcuate members 36, 38.

Figure 3:
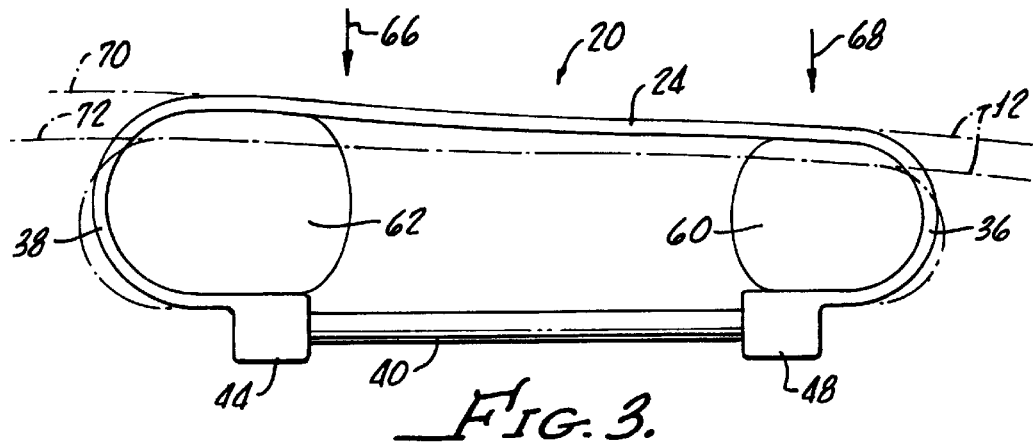
FIGS. 3–5 illustrate the resiliency provided by the suspension system in accordance with the present invention, with such resiliency being provided not only along a transverse axis of the saddle, but also along the longitudinal axis of the saddle, thus providing fore-aft resiliency.

While two resilient members 60, 62 are shown within each of the arcuate members 36, 38 in FIGS. 2 and 3, it should be appreciated that only one need be utilized. Further, the present invention encompasses a plurality of such resilient members 60, 62, each having different resiliency in order to provide adjustable vibration and shock compensation to the shell 12, depending upon anticipated road conditions and rider size, weight and desired comfort. A rider can select from the plurality of resilient members 60, 62 in order to tailor the suspension system to his own style of riding and personal preference as well as contemplated ride duration and terrain conditions. In fact, a change in the suspension 20 resiliency can be made during a bicycle tour, if desired, by the rider, As illustrated in FIG. 3, the resilient members 60, 62 as well as the arcuate members 36, 38 working in combination provide transverse resiliency indicated by the arrows 66, 68, which result in a transverse displacement indicated by the dashed lines 70, 72.

Figure 4:
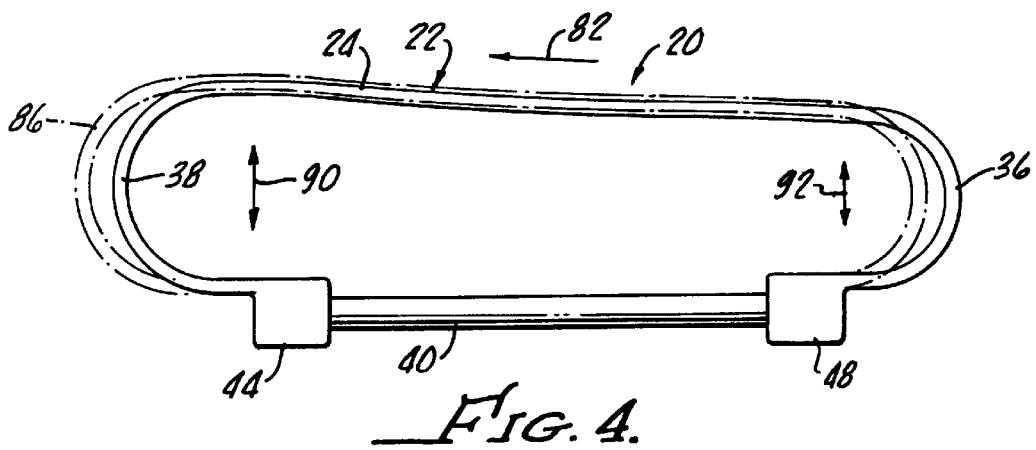
Figure 5:
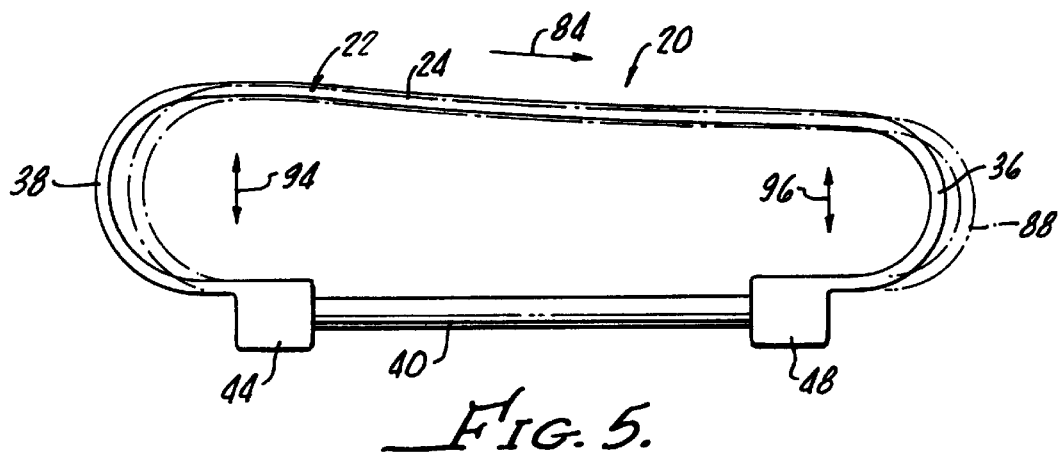

However, a suspension 20 in accordance with the present invention also provides for fore-aft resiliency as well as rocker-type resiliency is illustrated in FIGS. 4 and 5. It is to be noted that the resilient members 60, 62 are not shown in FIGS. 4 and 5 for sake of clarity in illustrating the resiliency provided by the basic U-member 22 structure. This fore-aft resiliency along a longitudinal axis 80 (see FIG. 1) is important in very coarse terrain situations wherein the bicycle frame transmits fore and aft shocks to a bicycle seat post (not shown) to which the rails 40, 42 are attached. The resiliency provided by the suspension system is indicated by arrows 82, 84 and dash lines 86, 88 in FIGS. 4 and 5 when coupled with transverse resilient movement as shown by arrows 90, 92, 94, 96, rocker-type movement/resiliency is provided by the suspension 20 in accordance with the present invention.

It should also be appreciated, as shown in FIG. 5, that the arcuate member radius 36 may have a different radius than the arcuate member 38, in order to further control the resiliency and harmonics of transmitted vibration in order to provide a smoother more comfortable ride.

Figure 6:
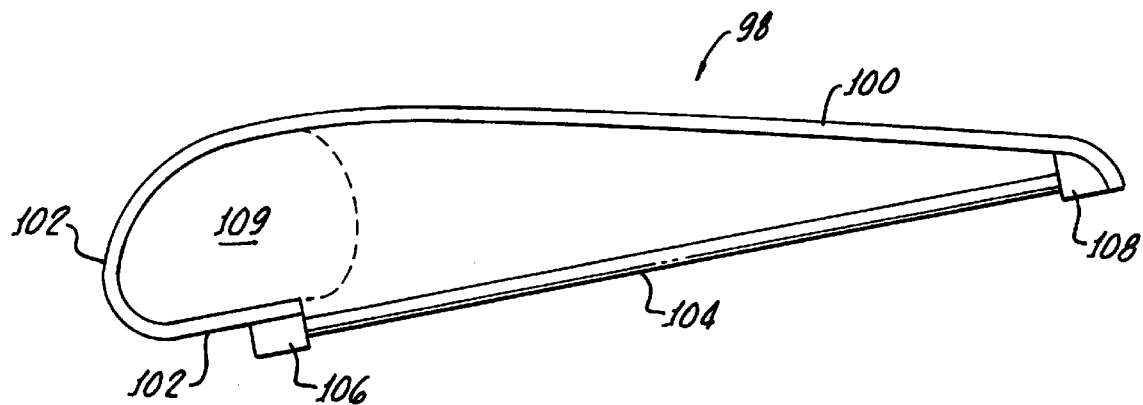
FIG. 6 is a representation, or cross section, of another embodiment of the present invention.

With reference to FIG. 6, there is shown an alternative embodiment 98 of a suspension made in accordance with the present invention shown in a representative cross sectional manner similar to FIG. 2, but with the shell 12 not being shown for the sake of clarity. Attachment of the suspension 98 to the shell 12 being made with contact of an elongated portion 100, as hereinabove described in connection with the saddle 10 and suspension 12. That is, the suspension 98 may be integrally molded with the shell 12 or attached thereto by nuts and screw 30, 32, as shown in FIG. 2.

In this embodiment, a single arcuate member means 100 extends from the elongate portion 100 and provides resiliency between an end 102 and the elongate portion 100.

As hereinabove described, in connection with the suspension 20 shown in FIG. 2, at least one rail 104 may be insert molded into support portions 106, 108.

Also, as hereinabove described, a resilient member 109 may be provided within the arcuate member 98 in order to provide adjustable vibration and shock compensation, as hereinabove discussed.

Figure 7:
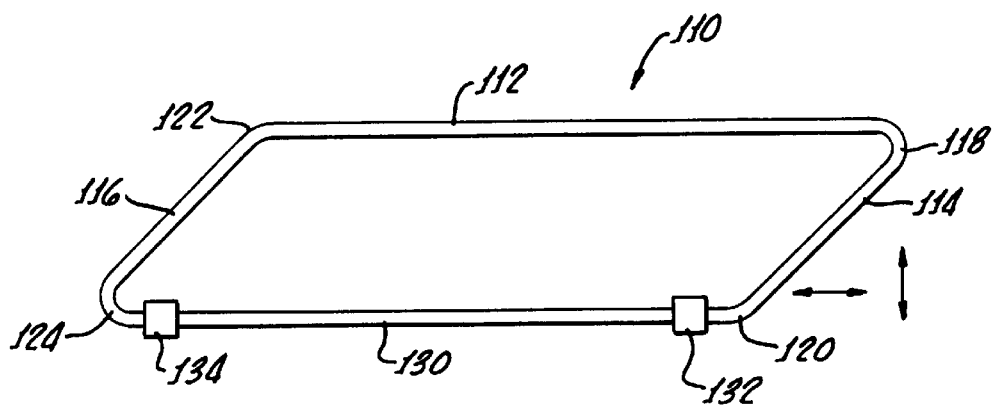
FIG. 7 is a representation or cross section of yet another embodiment of the present invention.

With reference to FIG. 7, there is shown yet another embodiment 110 in accordance with the present invention, having elongate member 112, which may be attached to an underside 26 of the shell 12 shown in FIGS. 1 and 2, and hereinabove described in connection with the suspension 20 and the suspension 94 shown in FIG. 6.

Turning again to FIG. 7, two depending end portions 114, 116 are attached to and subtend the elongate portion 112 and may be formed from any suitable resilient material. Each end portion 114, 116 includes angular portions 118, 120, 122, 124, which provide resiliency between the end portions 114, 116 and the elongate portion 112. The depending end portions 114, 116 are disposed in an opposing relationship and one or more rails 130 are disposed therebetween, preferably by insert molding, to support portions 132, 134 as hereinabove described in connection with the embodiments 20 and 94.

Although there has been hereinabove described a bicycle saddle and suspension in accordance with the present invention, for the purpose of illustrating the manner in which the invention may be used to advantage, it will be appreciated that the invention is not limited thereto. Accordingly, any and all modifications, variations, or equivalent arrangements which may occur to those skilled in the art, should be considered to be within the scope of the invention as defined in the appended claims.

What is claimed is:

1. A bicycle saddle suspension comprising:
   a generally U-shaped suspension member having elongate portion means for attachment to an underside of a bicycle saddle and two end portions, each end portion having end subtending arcuate member means, extending from the elongate portion means, for providing resiliency between the subtended end and said elongate portion means, the subtended ends being disposed in an opposing relationship;
   a pair of rails disposed between the opposing subtended ends; and
   a plurality of separate resilient member means for changing the resiliency of the arcuate member means, each of the plurality of separate resilient member means having a different resiliency and adapted to be removably inserted within one of the arcuate member means.

2. The bicycle saddle suspension according to claim 1 wherein said elongate portion means and the arcuate member means are integrally formed.

3. The bicycle saddle suspension according to claim 2 wherein said elongate portion means and arcuate member means are formed from a plastic material.

4. The bicycle saddle suspension according to claim 1 wherein the arcuate member means of each end portion have a generally C-shaped cross section.

5. A bicycle saddle suspension comprising:
   a generally U-shaped suspension member having elongate portion means for attachment to an underside of a bicycle saddle and two end portions, each end portion having end subtending arcuate member means, extending from the elongate portion means, for providing resiliency between the subtended end and said elongate portion means, the subtended ends being disposed in an opposing relationship, said arcuate member means of each end portion having a generally C-shaped cross section;
   two resilient member means, one disposed within each of the C-shaped arcuate member means, for changing the resiliency of the C-shaped arcuate member means, each of the two resilient member means having different resiliency and
   a pair of rails disposed between the opposing subtended ends.

6. The bicycle saddle suspension according to claim 5 wherein each arcuate member means has a different thickness.

7. The bicycle saddle suspension according to claim 5 wherein the arcuate member means have different radii of the C-shaped.

8. A bicycle saddle comprising:
   a shell having a tail portion and a horn extending therefrom;
   a generally U-shaped suspension member having an elongate portion attached to an underside of the shell and two end portions, each end portion having end portion subtending arcuate member means, extending from the elongate portion, for providing resiliency between the subtended end and said elongate portion means, the subtended ends being disposed in an opposing relationship;
   a plurality of separate resilient member means for changing the resiliency of the arcuate member means, each of the plurality of separate resilient member means having a different resiliency and adapted to be removably inserted within one of the arcuate member means; and
   a pair of rails disposed between the opposing subtended ends.

9. The bicycle saddle according to claim 8 wherein said elongate portion and the arcuate member means are integrally formed.

10. The bicycle saddle suspension according to claim 9 wherein said elongate portion and arcuate member means are formed from a plastic material.

11. The bicycle saddle according to claim 9 wherein said elongate portion and said shell are integrally formed.

12. The bicycle saddle according to claim 11 wherein said elongate portion, arcuate member means and shell are formed from a plastic material.

13. The bicycle saddle suspension according to claim 8 wherein the arcuate member means of each end portion having a generally C-shaped cross section.

14. The bicycle saddle according to claim 8 further comprising means for providing each arcuate member means with different resiliency.

15. The bicycle saddle according to claim 14 wherein the means for providing each arcuate member means with different resiliency includes different thickness of each arcuate member means.

16. The bicycle saddle according to claim 14 wherein the means for providing each arcuate member means with different resiliency includes different radii of the C-shaped arcuate member means.

17. A bicycle saddle comprising:
   a shell having a tail portion and a berm extending therefrom;
   a suspension member having elongate portion attached to an underside of a bicycle saddle and a depending end portion, the end portion having end subtending arcuate member means, extending from the elongate portion, for providing resiliency between the subtended end and said elongate portion;
   a plurality of separate resilient member means for changing the resiliency of the arcuate member means, each of the plurality of separate resilient member means having a different resiliency and adapted to be removably inserted within one of the arcuate member means; and
   a pair of rails disposed between the depending end portion and the elongate portion.

* * * * *